(12) United States Patent
Chu et al.

(10) Patent No.: US 6,493,720 B1
(45) Date of Patent: Dec. 10, 2002

(54) METHOD AND SYSTEM FOR SYNCHRONIZATION OF METADATA IN AN INFORMATION CATALOG

(75) Inventors: Jing Huang Chu, San Jose, CA (US); Jacques Joseph Labrie, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/221,042

(22) Filed: Dec. 28, 1998

Related U.S. Application Data (60) Provisional application No. 60/072,504, filed on Jan. 26, 1998.

(51) Int. Cl.$^7$ .......................... G06F 17/00; G06F 11/00; G06F 12/00
(52) U.S. Cl. ................. 707/104; 707/1; 707/8
(58) Field of Search .................... 707/8, 200, 1–5, 707/500–510, 103, 104, 500.1, 511, 202–206; 710/200; 714/4; 705/26–27; 345/353, 356–357; 700/200–201

(56) References Cited

U.S. PATENT DOCUMENTS

| | | | |
|---|---|---|---|
| 5,717,925 A | | 2/1998 | Harper et al. |
| 5,721,911 A | | 2/1998 | Ha et al. |
| 5,897,634 A | * | 4/1999 | Attaluri et al. ................ 707/8 |
| 5,940,838 A | * | 8/1999 | Schmuck et al. ........... 707/200 |
| 6,021,508 A | * | 2/2000 | Schmuck et al. .............. 714/4 |
| 6,023,706 A | * | 2/2000 | Schmuck et al. ........... 707/200 |
| 6,032,216 A | * | 2/2000 | Schmuck et al. ........... 710/200 |
| 6,088,717 A | * | 7/2000 | Reed et al. ................. 709/201 |

\* cited by examiner

*Primary Examiner*—Safet Metjahic
*Assistant Examiner*—Te Tu Chen
(74) *Attorney, Agent, or Firm*—Fay, Sharpe, Fagan, Minnich & McKee, LLP (57) ABSTRACT

A method, apparatus, and article of manufacture for a metadata synchronizer. Data stored on a data storage device connected to a computer is synchronized. At specified intervals, a tool that operates on an object is monitored to identify changes to metadata of that object. When changes to the metadata are identified, an information catalog containing corresponding metadata for the object is updated.

25 Claims, 7 Drawing Sheets

METHOD AND SYSTEM FOR SYNCHRONIZATION OF METADATA IN AN INFORMATION CATALOG

PROVISIONAL APPLICATION

This application claims the benefit of U.S. Provisional Application No. 60/072,504, entitled "METADATA SYNCHRONIZATION," filed on Jan. 26, 1998, by Jing Huang Chu et al., which is incorporated by reference herein.

CROSS-REFERENCE TO RELATED APPLICATIONS

This application is related to the following co-pending and commonly-assigned patent applications:

U.S. application Ser. No. 09/221,542, entitled "TRANSFORMATION LINEAGE MODEL," filed on Dec. 28, 1998, by Jacques J. Labrie, currently pending;

U.S. Pat. No. 5,717,925, issued on Feb. 0, 1998, entitled "INFORMATION CATALOG SYSTEM WITH OBJECT-DEPENDENT FUNCTIONALITY," filed on Jun. 5, 1996, by Lloyd Harper et al., which is a continuation of application Ser. No. 08/135,355, filed on Oct. 8, 1993, by Lloyd Harper et al., which was abandoned on Jun. 5, 1996; and U.S. Pat. No. 5,721,911, issued on Feb. 24, 1998, entitled "MECHANISM FOR METADATA FOR AN INFORMATION CATALOG SYSTEM," filed on Jun. 25, 1996, by Khanh D. Ha et al., all of which applications are incorporated by reference herein.

BACKGROUND OF THE INVENTION

1. Field of the Invention.

This invention relates in general to computer-implemented objects, and in particular, to maintaining object relationships.

2. Description of Related Art.

Databases are computerized information storage and retrieval systems. A Database Management System (DBMS) stores and retrieves data in databases. Databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage. A DBMS can be an object-oriented database management system (OODBMS). An object-oriented database is organized into objects having members that can be pointers to other objects.

Metadata is information about other data. For example, metadata could be information that describes the name of a table or the location of a document, but it is not the actual data in the table or document. Some systems enable users to add or modify metadata for objects in a database. Additionally, some systems may store the metadata for the objects in multiple locations. If the metadata stored at one location changes, the metadata stored at other locations is no longer in synch.

Thus, there is a need in the art for metadata synchronization.

SUMMARY OF THE INVENTION

To overcome the limitations in the prior art described above, and to overcome other limitations that will become apparent upon reading and understanding the present specification, the present invention discloses a method, apparatus, and article of manufacture for a metadata synchronizer.

According to the present invention, data stored on a data storage device connected to a computer is synchronized. At specified intervals, a tool that operates on an object is monitored to identify changes to metadata of that object. When changes to the metadata are identified, an information catalog containing corresponding metadata for the object is updated.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
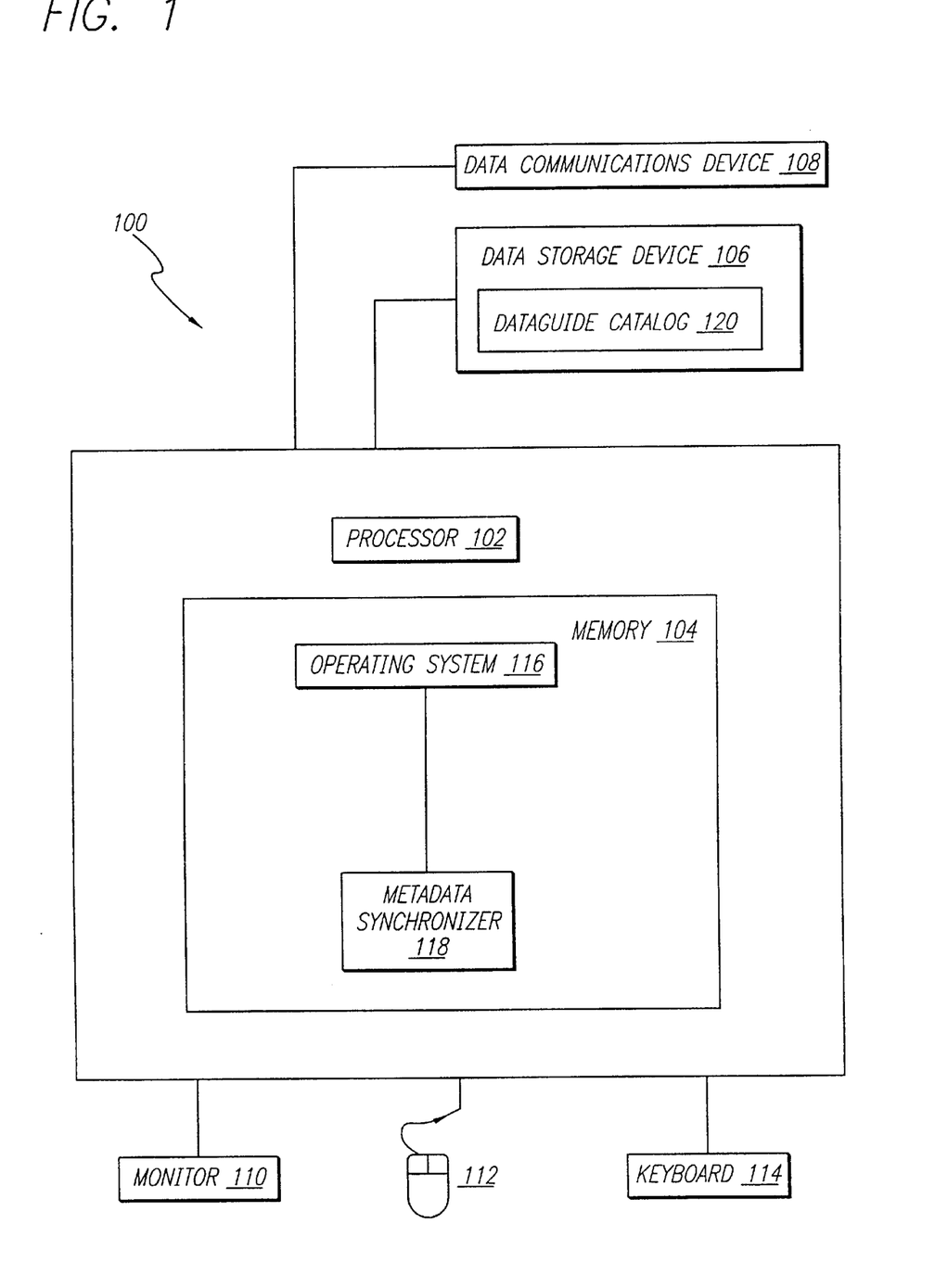
FIG. 1 is an exemplary hardware environment used to implement the preferred embodiment of the invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as MVS™, AIX™, OS/2™, WINDOWS NT™, WINDOWS™, UNIX™, etc. The operating system 116 is booted into the memory 104 of the computer 100 for execution when the computer 100 is powered-on or reset. In turn, the operating system 116 then controls the execution of one or more computer programs 118 by the computer 100. The present invention is generally implemented in these computer programs 118, which execute under the control of the operating system 116 and cause the computer 100 to perform the desired functions as described herein. Alternatively, the present invention may be implemented in the operating system 116 itself.

The operating system 116 and computer programs 118 are comprised of instructions which, when read and executed by the computer 100, causes the computer 100 to perform the steps necessary to implement and/or use the present invention. Generally, the operating system 116 and/or computer programs 118 are tangibly embodied in and/or readable from a device, carrier, or media, such as memory 104, data storage devices 106, and/or a remote device coupled to the computer 100 via the data communications devices 108. Under control of the operating system 116, the computer program 118 may be loaded from the memory 104, data storage devices 106, and/or remote devices into the memory 104 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Overview

One embodiment of the present invention provides a metadata synchronizer 118. The metadata synchronizer 118 synchronizes metadata for objects that are manipulated by different tools and that are cataloged in an information catalog. In particular, the metadata synchronizer 118 monitors one or more objects processed by other tools to determine whether metadata for any of the objects has changed. For example, the metadata synchronizer 118 may monitor a document object that is opened by a file manager application. If metadata for an object has changed, the metadata synchronizer 118 determines whether to modify metadata for that object in the information catalog. Thus, the metadata synchronizer 118 synchronizes the metadata for objects and provides currency for the metadata.

Figure 2:
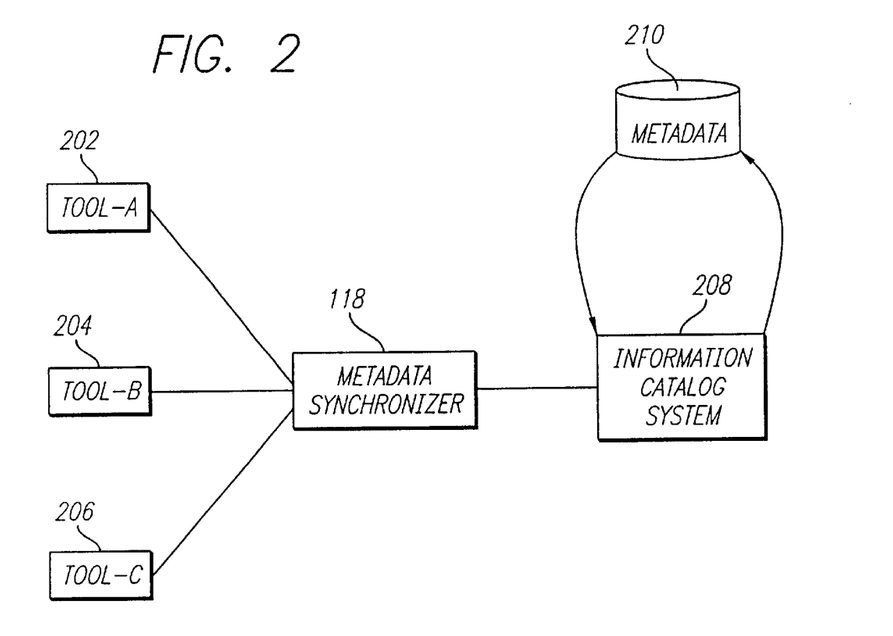
FIG. 2 is a block diagram illustrating the use of the metadata synchronizer.

FIG. 2 is a block diagram illustrating the use of the metadata synchronizer 118. The metadata synchronizer 118 monitors various tools, such as Tool-A 202, Tool-B 204, and Tool-C 206. The tools may be, for example, a file manager, a word processing program, or a database system. The metadata synchronizer 118 monitors for changes in metadata to objects that are processed by the tools 202, 204, or 206. These objects are registered with the information catalog system 208 so that metadata 210 about the objects can be stored in a data storage device. When the metadata of an object is changed by a tool, 202, 204, or 206, the metadata synchronizer 118 updates the metadata 210 of that object maintained by the information catalog system 208.

Information Catalog System

The information catalog system may be DataGuide™, a product from International Business Machines Corporation, Armonk, N.Y. The information catalog system is further described in the above cross-referenced applications. An overview of the information catalog will be provided for better understanding of the metadata synchronizer.

The information catalog system enables users to find out what data is available in a corporate environment. In particular, the information catalog system enables categorization. This allows users to add their own terminology to existing names for objects, including full names and information about what is stored. Also, the information catalog system enables users to organize information better in, for example, a flat list or tree structure. Also, the information catalog system enables users to access the data itself.

The information catalog system allows knowledge workers to define metadata (or "meta information") of objects types and object instances corresponding to information managed by one or more data storage resources under the control of one or more data processing nodes. The user-defined object types are customizable and extendable by knowledge workers or data processing administrators familiar with the objects. The users determine what information should be captured, what it is to be called, and how it is organized. The information catalog has no prior knowledge of the object types users will generate. However, the information catalog supports the user-generated object type with a defined set of information catalog functional services that are appropriate to the object types generated by users.

The information catalog system defines a plurality of functional categories within which the user-defined object types may be generated. Each functional category represents a categorization and/or subclassing of a super class of functional services provided by the information catalog. The functional categories to which the object types are assigned become part of the object type definition and limit the functions available to each object type. An object type is a data structure that may be thought of as a subclass object that encapsulates the functions inherited form the categories class to which the object type belongs, together with one or more property attributes corresponding to information that the knowledge worker wishes to catalog. The object types can be populated with object instances that are generated by assigning values to the property attributes to create meta information objects that uniquely identify units of information to be cataloged by the knowledge worker.

In the information catalog, the functional categories to which the object types may be assigned may include, but are not limited to, a "Grouping" category, an "Element" category, a "Program" category, a "Dictionary" category, a "Contact" category, and a "Support" category. For example, the "Grouping" category may contain a "Business Group" object type and a "Tables" object type.

All of the user-defined object types of the information catalog are placed in one of these six categories. Each category represents a distinct set of product functionality, such as "Information" objects corresponding to information form one or more data storage resources to be cataloged and "Support" objects corresponding to information that supports the cataloging of information defined by the Information objects.

Figure 3:
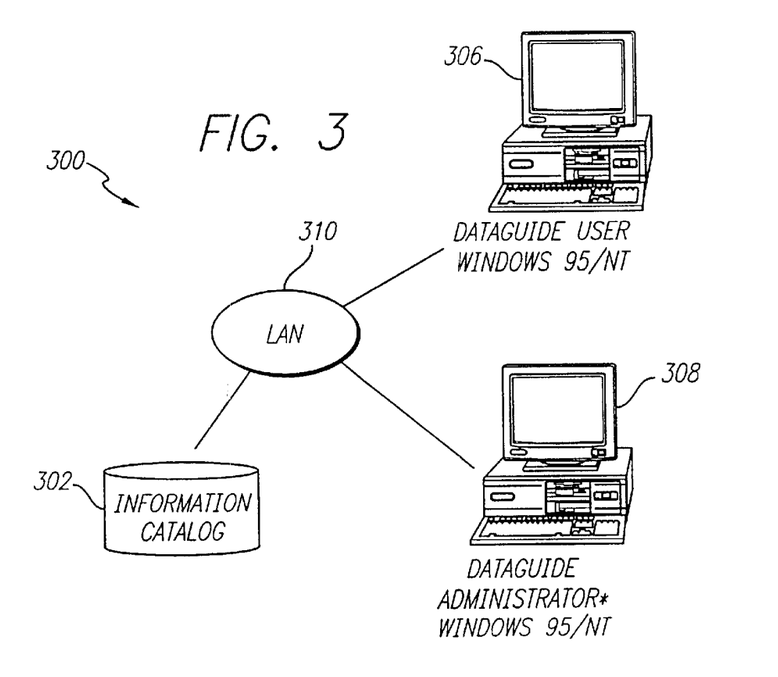
FIG. 3 illustrates a network of computers sharing an information catalog.

FIG. 3 illustrates a network 300 of computers sharing an information catalog 302. The information catalog 302 ("information catalog") contains metadata objects. The computers 306 and 308 are connected via a local area network ("LAN") 310 to each other and to the information catalog 302. The information catalog system resides on each of the computers 306 and 308. The information catalog system may reside on different platforms, including, but not limited to, a Windows 95/NT™ system 306 and 308.

The information catalog system may be used to catalog business information. When searching for information to solve business problems, users want to find the quickest and easiest route to the information. Users can do their searching with the information catalog system, without ever leaving their desktop. The information catalog system can be used in organizations of any size to catalog business information and make it available to anyone who needs it. Thus, the information catalog system enables multiple people to share information.

The information catalog system has powerful searching capabilities to help users locate information quickly and easily. Users can search on keywords, values, and types of information. Users can save searches to reuse at any time. Running saved searches enables users to view the most current information. Users can place saved search results on a desktop for easy future reference, thus avoiding redundant searches.

Figure 4:
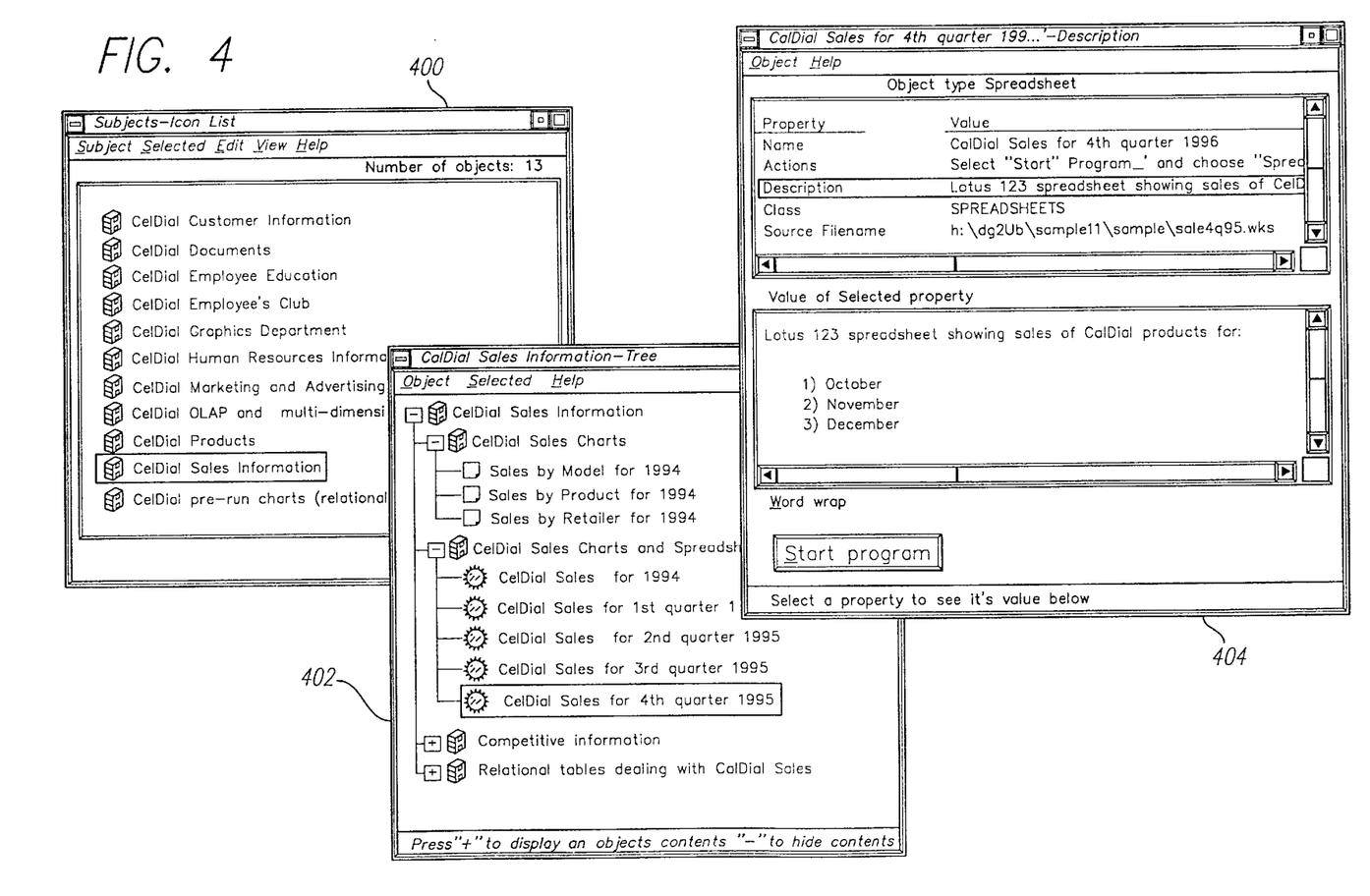
FIG. 4 illustrates the logical structure of the information catalog.

The information catalog system enables users to browse information that is available. Information is organized into a logical structure so users can locate the information needed. Users can use the built-in icon legend for quick reference to the types of information available, such as spreadsheets, charts, reports, tables, queries, images, video, and more. FIG. 4 illustrates windows 400, 402, and 404 that illustrate the logical structure of the information in the information catalog. By double clicking on an object displayed in one of the windows, 400, 402, and 404, a user obtains additional detail of that object.

For end users, the information catalog system provides a starting point for accessing information. It speeds users toward problem solving, and away from duplicate efforts to recreate what already exists. For information systems professionals, the information catalog system offers client/server efficiency, improves user satisfaction and frees up valuable time to focus on critical issues. For organizations, the information catalog system helps eliminate redundancy and expense, while extending the value of existing information resources.

The information catalog system helps users quickly set up an information catalog and customize the information catalog for an organization's needs. A comprehensive set of extractor utilities paves the way for users to access a wide variety of information sources. Users can build a glossary of special terms and jargon to support the use of consistent terminology throughout the users' company. The information catalog system lets users provide a list of information contacts to help others know where to go for more assistance. It also provides a news facility to quickly notify users of any updates to the information catalog system information.

Figure 5:
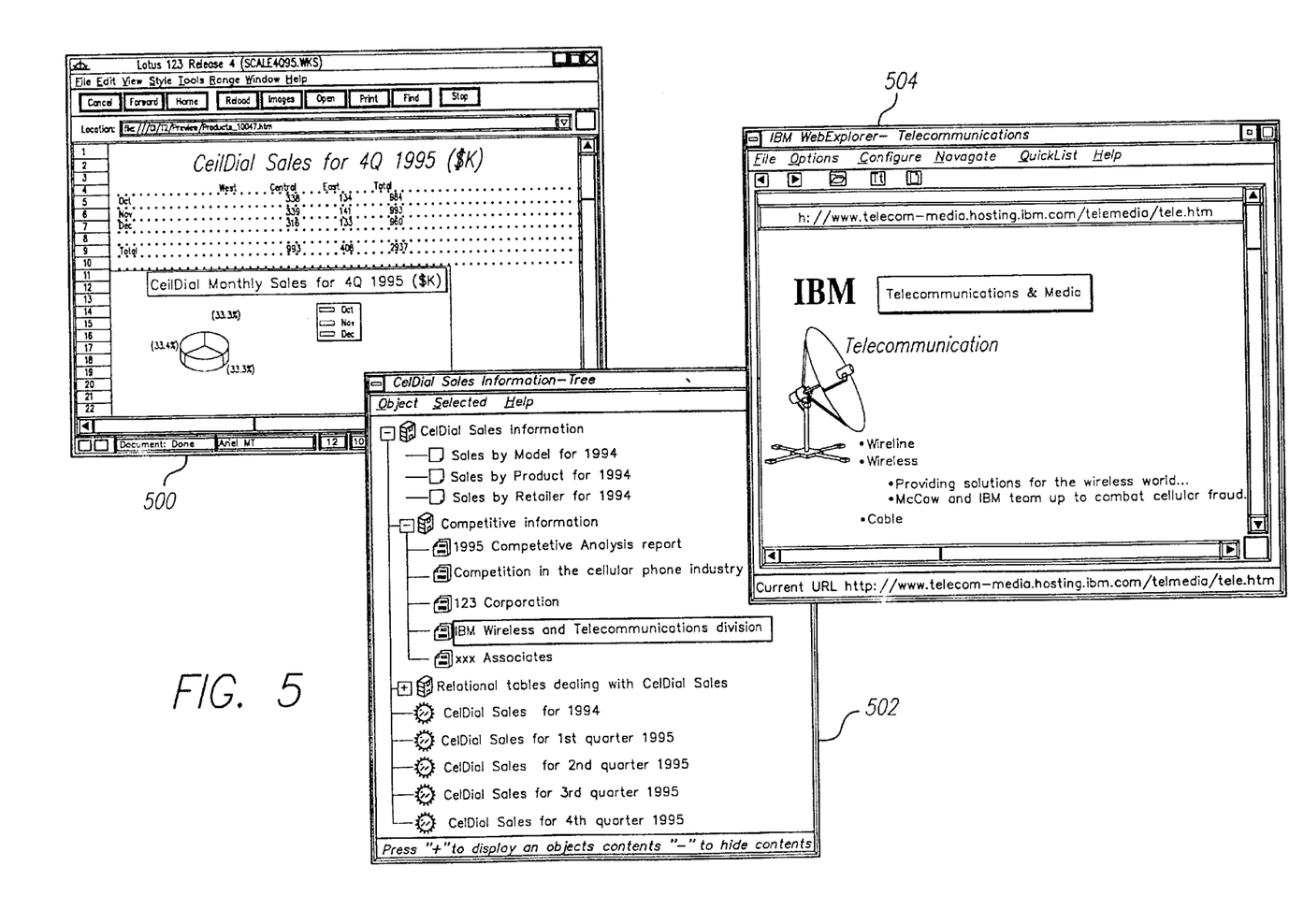
FIG. 5 illustrates windows displayed by the information catalog system.

The information catalog system leverages users' information investments by using the information catalog system to merge the power of mainframe and mid-size computers with the convenience of client/server technology. The information catalog system not only finds information, it also gives users the option to launch the desktop applications they use to process the information. FIG. 5 illustrates windows 500, 502, and 504 displayed by the information catalog system. The data catalog system enables users to start a program to retrieve and work with information, such as a spreadsheet of sales figures as in window 500. Additionally, users can use Uniform Resource Locators (URLs) to catalog home pages with the information catalog system as illustrated in windows 502 and 504.

The information catalog system can be used with a variety of popular software products, IBM and non-IBM, that users may already have. It is part of a complete solution that brings the information needed to the user's desktop. The information catalog system information is stored on DB2™, a database management system from IBM. The information catalog system provides a work group solution for information sharing. The information catalog system enables staff and management teams to locate key business information no matter where it is stored in the enterprise. The information catalog system provides an information catalog current and consistent information throughout the company. The information catalog system launches decision support and desktop tools to access data. The information catalog system provides an integration point with multiple vendors, such as Business Objects™.

The information catalog system makes it possible to determine what information is available, where it resides, what it means, what form it's in, who can provide additional information or assistance in regard to it, and how it is produced. It puts productivity, flexibility and manageability on the desktop of management and other business users.

The information catalog system provides a powerful business-oriented solution to help end users locate, understand, and access enterprise data. In client/server information catalogs, business metadata (data about data) can be described in business terms, organized into subject areas, and customized for a user workgroup's or enterprise's needs. The information catalog system is a Data Warehouse facility for integrating and managing end-user business metadata.

The information catalog system enables users to: locate data in the information catalog by keyword text search or navigation ("drill down") through a subject area and business groupings, to understand data by browsing metadata descriptions in business terms, and to access the data by launching applications directly from the information catalog system. Additionally, the information catalog system communicates comments and corrections on metadata descriptions to the information catalog system administrator via a comments object and shares administration of the information catalog system information catalog (when authorized).

The information catalog system provides an easy-to-use graphic interface in either the Microsoft Windows NT environment, the Windows 95 environment, or through the World Wide Web ("WWW" or "Web"). The information catalog system shares the same information catalogs with other the information catalog system users across a LAN or enterprise and identifies the owners for data via the contact object.

Metadata

Metadata is further described in the above cross-referenced applications. An overview of metadata will be provided for better understanding of the metadata synchronizer.

"Metadata" is information for describing other information, such as records or files. Metadata may be user-defined data, which is a user's description of object information that may later assist the user with searching and retrieval of the data.

Metadata objects have three contiguous parts, a header area, a definition area, and an object area. The header area contains information about the nature and size of the data structure. The definition area contains information about the property attributes of the object. The object area is used to contain values for the properties defined in the definition area.

Moreover, a functional category of Attachments enables creation of metadata which are logically attached to and further describe the metadata objects themselves or relationships in a information catalog system.

A programming relationship (link) may be added to allow for peer-to-peer relationships between the Grouping and Elemental blocks, or between objects within the Grouping block or between objects within the Elemental block. Links are stored in a relational database in memory located within the computer system of the information catalog.

By creating non-hierarchical relationships between objects, between or within these two categories, metadata objects can be linked which are logically related, are derived form the same source, have a foreign key relationship and provide a logical relationship between tow objects with an intervening object to name the relationship.

Metadata Synchronization

The metadata synchronizer 118 provides a mechanism which allows a user, such as an administrator, to register objects in a information catalog. In particular, the user may register the objects from a graphical user interface ("GUI") for the Visual Warehouse™ product, which is a product from International Business Machines, Corporation, Armonk, N.Y., or from the command line for the DB2™ OLAP™ server, which is a product from International Business Machines, Corporation, Armonk, N.Y., or from the command line for Hyperion Essbase™, which is a product from Hyperion Solutions, Corporation, Sunnyvale, Calif.

Once these objects are registered, changes in the metadata of the objects at their source or tool (e.g., at the Visual Warehouse™) are detected by the metadata synchronizer 118. The metadata synchronizer 118 monitors the tools on a timed basis. The user who registers the objects specifies how often synchronization is to occur. The metadata synchronizer 118 will refresh metadata in the information catalog, if needed.

The metadata synchronizer 118 provides system functions for monitoring tools on various platforms, but users can also provide user-defined monitoring functions for tools the metadata synchronizer 118 is already monitoring or for new tools.

A user invokes the metadata synchronizer 118 from a source (i.e., a tool) to have data pushed into the information catalog system. In this manner, objects from the source are registered with the information catalog system as candidates for synchronization. To perform synchronization, at scheduled intervals, the metadata synchronizer 118 looks at objects that are registered, and updates the objects in the information catalog according to changes in metadata of the objects. The scheduled interval refers to the schedule for performing synchronization, for example, every 24 hours.

The metadata synchronizer 118 maintains timestamps for metadata of objects for comparison purposes and to determine whether the information catalog system or the source has the most current metadata. This is especially useful as multiple sources may be modifying objects and their metadata. For example, if Tool-A were to modify the metadata for an object at Time-1 and Tool-B were to modify the metadata for the same object at Time-2, the metadata synchronizer 118 would recognize that the information at Time-2 is more recent and should override any previous changes to the metadata in the information catalog system that might reflect the changes made at Time-1 by Tool-A.

The user specifies the schedule (i.e., timings) for the synchronization to occur (e.g., every 24 hours). The user also specifies parameters to the metadata synchronizer 118 for use in monitoring and updating objects. In particular, the user provides parameters to override the default parameters set by the information catalog system. The parameters include, but are not limited to, a user identifier and password for the user entering the parameters, the name or location of the source of the metadata, and the name of the information catalog system category in which the corresponding metadata resides. Additionally, a user specifies whether the tree structure of objects provided by the information catalog system should be used or whether that tree structure should be regenerated with the metadata from the source.

Figure 6:
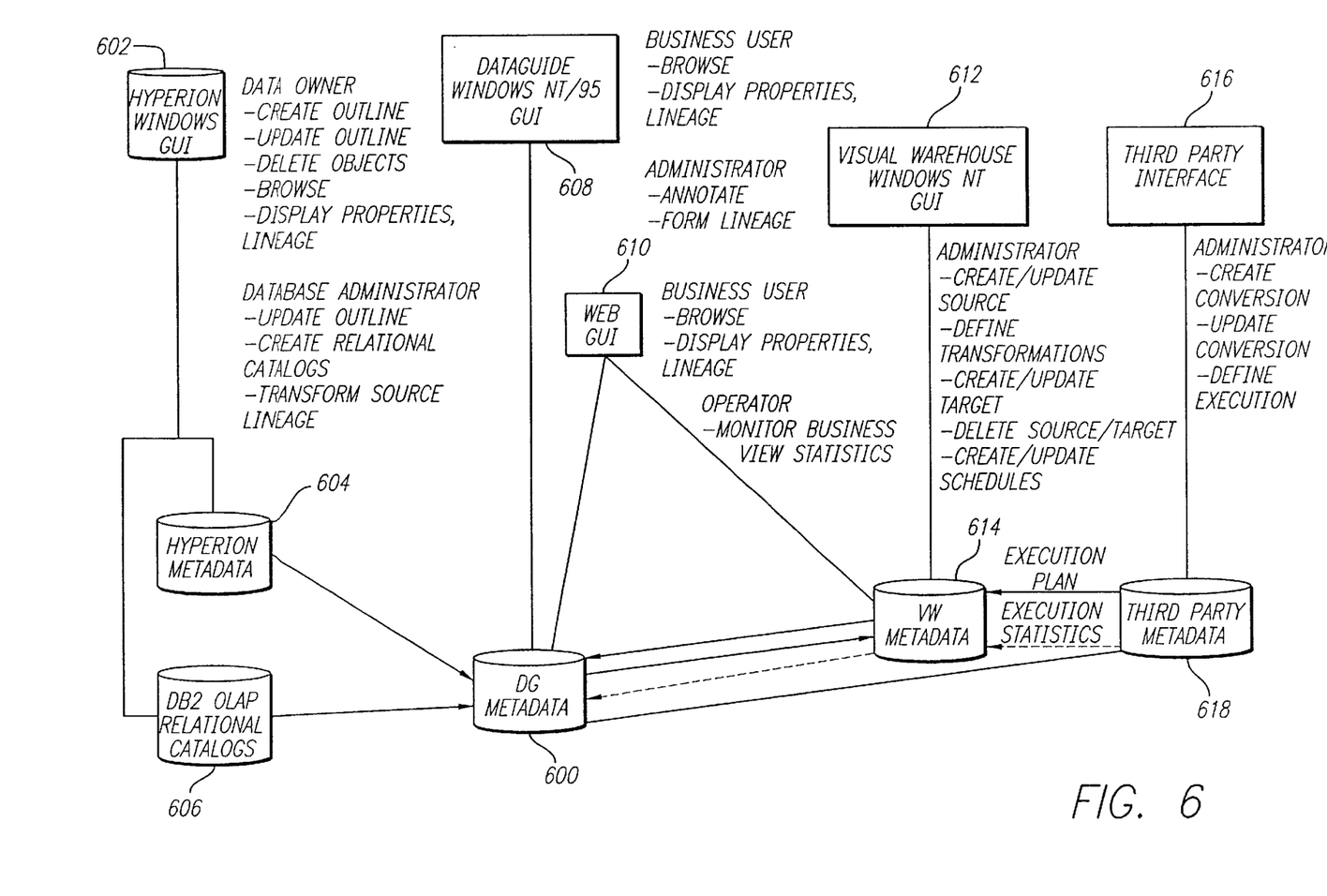
FIG. 6 is a block diagram illustrating the use of the metadata synchronizer with various platforms.

FIG. 6 is a block diagram illustrating the use of the metadata synchronizer 118 with various platforms. The information catalog system may be the DataGuide™ product. Thus, the DataGuide™ metadata 600 contains the metadata for objects registered with DataGuide™ (i.e., the information catalog system).

A Hyperion Essbase™ Windows GUI 602 is connected to a Hyperion Essbase™ metadata database 604 and a DB2 OLAP™ relational catalogs database 606. From the Hyperion Essbase™ Windows GUI 602, a data owner can create or update an outline for data, delete objects, browse for objects, and display properties and the lineage of objects. The lineage may refer to the source or transformation that resulted in the current state of the object. These actions may affect the metadata of objects stored in databases 604 and 606. Thus, the metadata synchronizer 118 will update the DataGuide™ metadata 600.

A DataGuide™ Windows NT/95™ GUI 608 is connected directly to the DataGuide™ metadata 600. The DataGuide™ product is one that may be used to create and maintain the information catalog's metadata for objects. From the DataGuide™ Windows NT/95™ GUI 608, a business user can browse metadata for objects or display the properties or lineage of objects. Also, from the DataGuide™ Windows NT/95™ GUI 608, an administrator can annotate the metadata or form lineage information. These actions directly affect the DataGuide™ metadata 600.

A Web GUI 610 can be either a DataGuide™ or a Visual Warehouse™ Web GUI that is connected to the DataGuide™ metadata 600 and 614. From a DataGuide™ Web GUI, a business user may browse metadata and display properties and lineage. From a Visual Warehouse™ Web GUI, an operator can monitor business view statistics. These actions may affect the DataGuide™ metadata 600 directly.

A Visual Warehouse™ Windows NT™ GUI 612 is connected to Visual Warehouse™ metadata 614. An administrator at the Visual Warehouse™ Windows NT™ GUI 612 may create/update source metadata 614, define transformations, create/update target metadata, delete sources or targets, and create or update schedules for actions affecting data. As these actions affect the Visual Warehouse™ metadata 614, the metadata synchronizer 118 modifies the DataGuide™ metadata 600 to reflect updates.

A third party interface 616 is connected to third party metadata 618. At the third party interface, an administrator creates conversions, updates conversions, and defines execution plans. The execution plan and execution statistics are transmitted to the Visual Warehouse™ metadata 614. Then, the metadata synchronizer 118 synchronizes the execution statistics at the Visual Warehouse™ metadata with the DataGuide™ metadata 600. Also, the metadata synchronizer 118 synchronizes third party metadata 618 with the DataGuide™ metadata 600.

Figure 7:
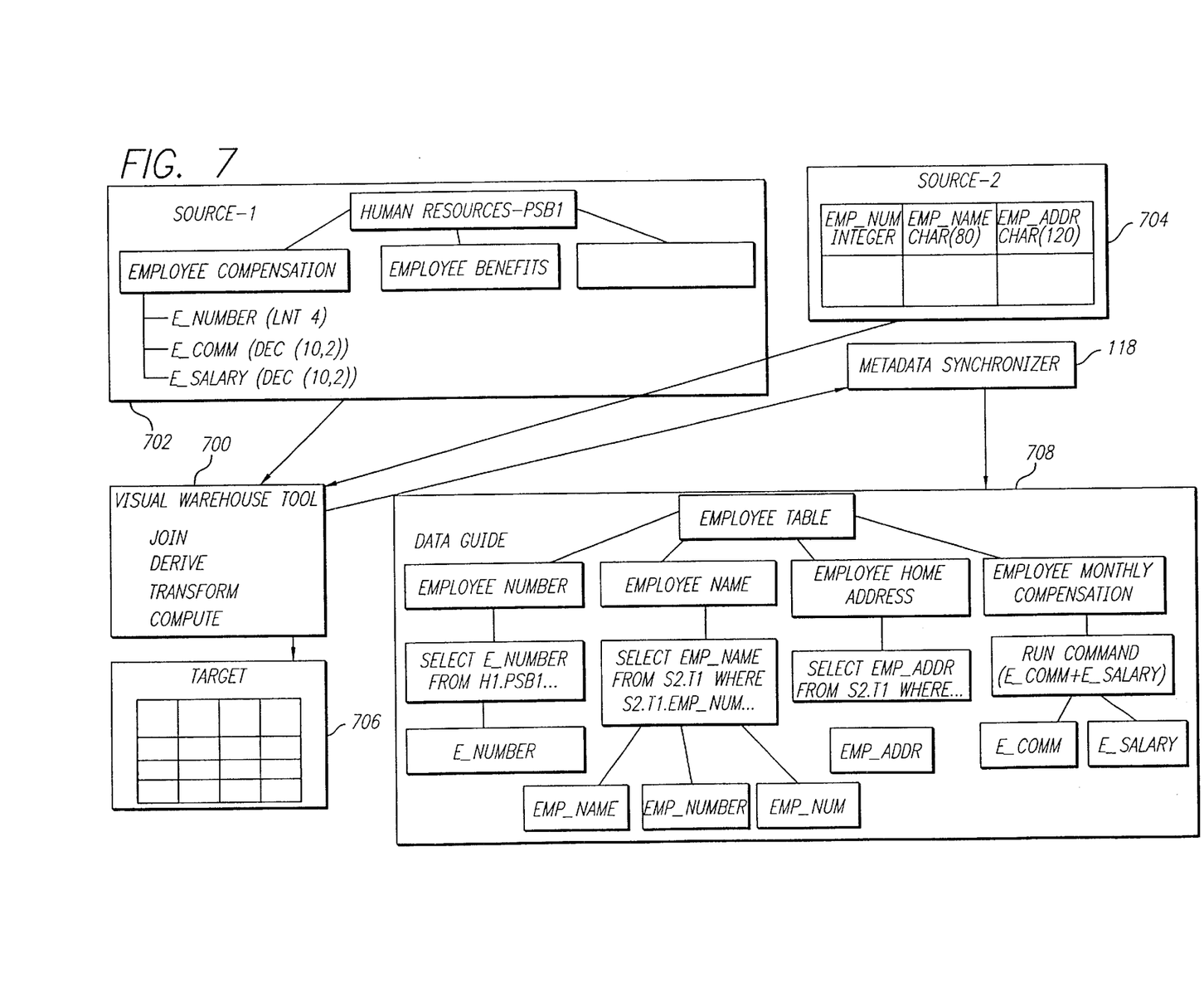
FIG. 7 is a block diagram illustrating metadata integration by the metadata synchronizer.

FIG. 7 is a block diagram illustrating metadata integration by the metadata synchronizer 118. The Visual Warehouse™ tool 700 takes data from Source-1 702 and/or Source-2 704 and modifies or adds to data in the Target 706. The Visual Warehouse™ tool 700 can perform various operations on the source data, including, but not limited to, joining tables, deriving information, transforming data, and computing a value. Source-1 702 contains an object having a tree structure and containing employee information. Source-2 704 contains a table object of employee information. The Visual Warehouse™ tool 700, for example, can operate on the objects of Source-1 702 and Source-2 704 to modify a table object in the Target 706.

The DataGuide™ displays an information catalog 708, represented with a tree structure and identifying objects that have been registered with DataGuide™. Some of the objects include employee information objects, such as an employee's address ("Emp_Addr") or and employee's number ("Emp_Number"). The Visual Warehouse™ tool 700 may have modified the metadata for the employee's number from Source-1 and the employee's address from Source-2. The metadata synchronizer 118 monitors the Visual Warehouse™ tool 700, detects that metadata for objects registered with DataGuide™ has changed, and updates the metadata in the information catalog 708 to reflect the changes.

Figure 8:
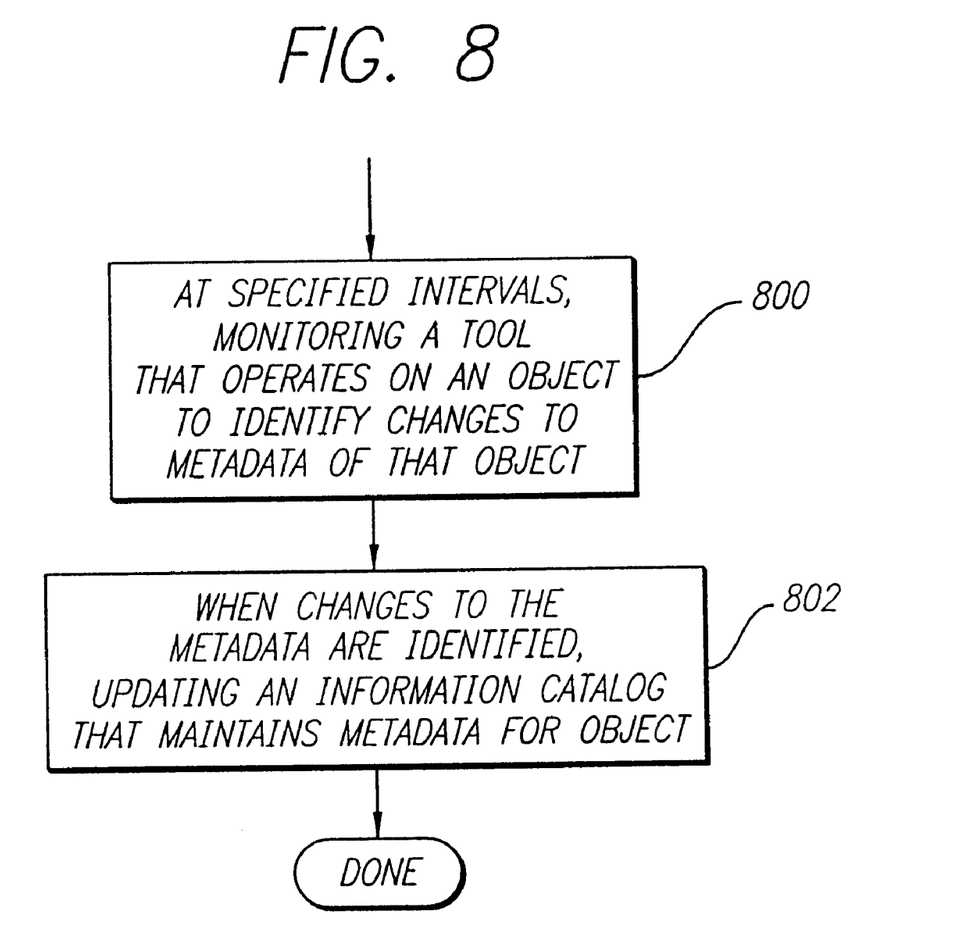
FIG. 8 is a flow diagram illustrating the steps performed by the metadata synchronizer 118.

FIG. 8 is a flow diagram illustrating the steps performed by the metadata synchronizer 118. In Block 800, the metadata synchronizer 118 monitors, at specified intervals, a tool that operates on an object to identify changes to metadata of that object. In Block 802, when changes to the metadata are identified, the metadata synchronizer 118 updates an information catalog containing corresponding metadata for the object.

The metadata synchronizer 118 is especially advantageous in that it is open ended. That is, the metadata synchronizer 118 will allow other types of metadata to be registered into the information catalog system for the purpose of synchronization. This requires writing metadata source specific synchronizers, but the architecture of all synchronization remains consistent. Synchronization occurs in the background and generally does not require user interaction. Additionally, the metadata synchronizer 118 will allow other tools to register objects for synchronization.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of synchronizing data stored on a data storage device connected to a computer, comprising the steps of:
    providing an information catalog storing a synchronizing time determining specific intervals;
    at said specific intervals, monitoring a tool that operates on an object to identify changes to metadata of that object; and
    when changes to the metadata are identified, updating said information catalog containing corresponding metadata for the object.

2. The method of claim 1, wherein each of the objects is registered with said information catalog.

3. The method of claim 1, wherein the specified intervals are specified by a user.

4. The method of claim 1, wherein the step of monitoring includes monitoring a system function integral to a platform.

5. The method of claim 1, wherein the step of monitoring includes monitoring a user-defined function.

6. The method of claim 1, wherein the monitoring further comprises monitoring multiple tools.

7. The method of claim 1, wherein the data storage device is a first data storage device and wherein the information catalog resides on a second data storage device.

8. An apparatus for synchronizing data, comprising:
    an information catalog containing synchronizing times identifying specified monitoring intervals;
    a computer having a memory and a data storage device coupled thereto that stores the data; and,
    one or more computer programs, performed by the computer, for, at said specified monitoring intervals, monitoring a tool that operates on an object to identify changes to metadata of that object, and, when changes to the metadata are identified, updating said information catalog containing corresponding metadata for the object.

9. The apparatus of claim 8, wherein each of the objects is registered with said information catalog.

10. The apparatus of claim 8, wherein the specified intervals are specified by a user.

11. The apparatus of claim 8, wherein the one or more computer programs for monitoring a tool include a system function integral to the apparatus for monitoring a tool on a platform.

12. The apparatus of claim 8, wherein the one or more computer programs for monitoring a tool include a software interface for incorporating user-defined functions for monitoring one of an existing and a new tool.

13. The apparatus of claim 8, wherein the means for monitoring a tool further comprises means for monitoring multiple tools.

14. The apparatus of claim 8, wherein the data storage device is a first data storage device and wherein the information catalog resides on a second data storage device.

15. An article of manufacture comprising a program storage medium readable by a computer and embodying one or more instructions executable by the computer to perform method steps for synchronizing data stored on a data storage device, the method comprising the steps of;
    providing an information catalog;
    at specified intervals determined by synchronizing times stored in the information catalog, monitoring a tool that operates on an object to identify changes to metadata of that object; and
    when changes to the metadata are identified, updating said information catalog containing corresponding metadata for the object.

16. The article of manufacture of claim 15, wherein each of the objects is registered with said information catalog.

17. The article of manufacture of claim 15, wherein the specified intervals are specified by a user.

18. The article of manufacture of claim 15, wherein the step of monitoring includes monitoring a system function integral to the metadata synchronizer for monitoring a tool on a platform.

19. The article of manufacture of claim 15, wherein the one or more computer programs for monitoring a tool include a software interface for incorporating user-defined functions for monitoring one of an existing and a new tool.

20. The article of manufacture of claim 15, wherein the monitoring further comprises monitoring multiple tools.

21. The article of manufacture of claim 15, wherein the data storage device is a first data storage device and wherein the information catalog resides on a second data storage device.

22. A metadata synchronizer for use with a system wherein objects are manipulated by tools for synchronizing metadata of the objects with catalogued metadata of the objects stored in an information catalog, the metadata synchronizer comprising:

a registry identifying a first object registered with the metadata synchronizer;

a monitor for monitoring said tools at predetermined intervals to detect changes in the metadata associated with said first object; and, an updater for selectively updating the catalogued metadata of said first object stored in the information catalog when a change is detected to the metadata associated with said first object, wherein the registry is operative to register synchronizing times associated with the registered objects, said synchronizing times determining the redetermined intervals at which the monitor monitors the tool.

23. A metadata synchronizer for use with a system wherein objects are manipulated by tools for synchronizing metadata of the objects with catalogued metadata of the objects stored in an information catalog, the metadata synchronizer comprising:

a registry identifying a first object registered with the metadata synchronizer;

a monitor for monitoring said tools at predetermined intervals to detect changes in the metadata associated with said first object; and, an updater for selectively updating the catalogued metadata of said first object stored in the information catalog when a change is detected to the metadata associated with said first object, wherein the registry is operative to register timestamps associated with metadata of registered objects whereby the updater synchronizes with the most recently changed metadata.

24. A metadata synchronizer, for use with a system wherein objects are manipulated by tools for synchronizing metadata of the objects with catalogued metadata of the objects stored in an information catalog, the metadata synchronizer comprising:

a registry identifying a first object registered with the metadata synchronizer;

a monitor for monitoring said tools at predetermined intervals to detect changes in the metadata associated with said first object; and, an updater for selectively updating the catalogued metadata of said first object stored in the information catalog when a change is detected to the metadata associated with said first object, wherein the registry is operative to register parameters governing the metadata synchronizer system, said parameters including at least one of: a user identifier, a user password, a metadata location, an information catalog category corresponding to the metadata, and a tree structure regeneration option selection value.

25. A metadata synchronizer for use with a system wherein objects are manipulated by tools for synchronizing metadata of the objects with catalogued metadata of the objects stored in an information catalog, the metadata synchronizer comprising:

a registry identifying a first object registered with the metadata synchronizer;

a monitor for monitoring said tools at predetermined intervals to detect changes in the metadata associated with said first object; and, an updater for selectively updating the catalogued metadata of said first object stored in the information catalog when a change is detected to the metadata associated with said first object, the updater being operative to update the metadata to update at least one of a metadata header, a metadata definition area, and a metadata object area.

* * * * *